US012684374B2

(12) United States Patent
Kainulainen et al.

(10) Patent No.: US 12,684,374 B2
(45) Date of Patent: Jul. 14, 2026

(54) METHODS AND APPARATUSES RELATING TO WIRELESS COMMUNICATION

(71) Applicant: Nokia Technologies Oy, Espoo (FI)

(72) Inventors: Jani-Pekka Kainulainen, Cambridge (GB); Riikka Karoliina Dimnik, Espoo (FI); Ali Karimidehkordi, Munich (DE); Tero Henttonen, Espoo (FI); Lars Dalsgaard, Oulu (FI)

(73) Assignee: Nokia Technologies Oy, Espoo (FI)

( * ) Notice: Subject to any disclaimer, the term of this patent is extended or adjusted under 35 U.S.C. 154(b) by 120 days.

(21) Appl. No.: 18/941,851

(22) Filed: Nov. 8, 2024

(65) Prior Publication Data

US 2025/0159501 A1      May 15, 2025

(30) Foreign Application Priority Data

Nov. 10, 2023    (GB) ..................................... 2317225

(51) Int. Cl.
| | |
|---|---|
| *H04W 24/02* | (2009.01) |
| *H04W 24/10* | (2009.01) |
| *H04W 52/02* | (2009.01) |

(52) U.S. Cl.
CPC ........... *H04W 24/02* (2013.01); *H04W 24/10* (2013.01); *H04W 52/0209* (2013.01)

(58) Field of Classification Search
CPC . H04W 24/02; H04W 24/10; H04W 52/0209; H04W 76/27
See application file for complete search history.

(56) References Cited

U.S. PATENT DOCUMENTS

| | | | | |
|---|---|---|---|---|
| 10,531,326 | B2 * | 1/2020 | Hong | H04W 72/23 |
| 12,150,083 | B1 * | 11/2024 | Rao | G01S 5/01 |
| 12,413,994 | B2 * | 9/2025 | Thangarasa | H04W 24/10 |
| 12,464,398 | B2 * | 11/2025 | Kim | H04W 24/10 |

(Continued)

FOREIGN PATENT DOCUMENTS

| | | |
|---|---|---|
| CN | 111526523 A | 8/2020 |
| WO | 2020/109651 A1 | 6/2020 |

(Continued)

OTHER PUBLICATIONS

Improvement_on_ScellSCG_setup_delay_3GPP-R4-2308822 (Year: 2023).*

(Continued)

*Primary Examiner* — Kevin T Bates
*Assistant Examiner* — Poonam Sharma
(74) *Attorney, Agent, or Firm* — Nokia Technologies Oy

(57)      ABSTRACT

This specification describes a terminal device comprising: means for receiving, at the terminal device from at least one base station of a telecommunications network, configuration information which is indicative of a modified configuration for a measurement validity duration pre-configured at the terminal device, wherein the measurement validity duration is for use in validating measurements of signals received from at least one cell of the telecommunications network performed by the terminal device in an idle mode or an inactive mode; and means for determining whether to follow the modified configuration for the measurement validity duration or the pre-configured measurement validity duration.

11 Claims, 4 Drawing Sheets

(56) References Cited

U.S. PATENT DOCUMENTS

| | | | |
|---|---|---|---|
| 2019/0037425 | A1 | 1/2019 | Hong et al. |
| 2021/0235300 | A1 | 7/2021 | Teyeb et al. |
| 2021/0344463 | A1 | 11/2021 | Bergqvist et al. |
| 2022/0116809 | A1 | 4/2022 | Cheng et al. |
| 2022/0279369 | A1 | 9/2022 | Kim et al. |
| 2023/0254851 | A1 | 8/2023 | Prasad et al. |

FOREIGN PATENT DOCUMENTS

| | | | |
|---|---|---|---|
| WO | 2022/263314 | A1 | 12/2022 |
| WO | 2023/133302 | A1 | 7/2023 |
| WO | 2023/154446 | A1 | 8/2023 |
| WO | 2024/035079 | A1 | 2/2024 |
| WO | 2024/035507 | A1 | 2/2024 |
| WO | 2024/208712 | A1 | 10/2024 |
| WO | 2024/236376 | A1 | 11/2024 |

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.6.0, Sep. 2023, pp. 1-211.

"WF on improvement on FR2 SCell/SCG setup/resume", 3GPP TSG-RAN WG4 Meeting #105, R4-2220415, Agenda: 8.21.5, Apple, Nov. 14-18, 2022, 2 pages.

"WF on NR Mobility Enhancements RRM requirements (part 2)", 3GPP TSG-RAN4 Meeting #106, R4-2303176, Agenda: 9.23.7, Apple, Feb. 27-Mar. 3, 2023, 11 pages.

"WF on improvement on FR2 SCell/SCG setup/resume", 3GPP TSG-RAN WG4 Meeting # 104-bis-e, R4-2217260, Agenda: 6.20.2, Apple, Oct. 10-19, 2022, 5 pages.

"WF on Further NR Mobility Enhancements", 3GPP TSG-RAN WG4 Meeting # 104-e, R4-2214348, Agenda: 11.16, MediaTek Inc., Aug. 15-26, 2022, 5 pages.

"3rd Generation Partnership Project; Technical Specification Group Radio Access Network; NR; Radio Resource Control (RRC) protocol specification (Release 17)", 3GPP TS 38.331, V17.6.0, Sep. 2023, pp. 1-1337.

United Kingdom Application No. 2314796.0, "Measurement Validation", filed on Sep. 27, 2023, pp. 1-52.

"Discussion on Improvement on SCell/SCG setup delay", 3GPP TSG-RAN WG4 Meeting #109, R4-23xxxxx, Nokia, Nov. 13-17, 2023, 2 pages.

Search Report received for corresponding United Kingdom Patent Application No. 2317226.5, dated May 10, 2024, 3 pages.

"Discussion on improvement on ScellSCG setup delay", 3GPP TSG-3GPP TSG-RAN4 Meeting #107, R4-2309426, Agenda: 8.25.4, Qualcomm Incorporated, May 22-26, 2023, 8 pages.

Search Report received for corresponding United Kingdom Patent Application No. 2317225.7, dated May 20, 2024, 4 pages.

"Discussion on early measurements enhancements", 3GPP TSG-RAN WG2 #124, R2-2312832, Agenda: 7.4.5, Ericsson, Nov. 13-17, 2023, pp. 1-8.

Search Report received for corresponding United Kingdom Patent Application No. 2317233.1, dated May 20, 2024, 3 pages.

Examiner's tentative rejection received for corresponding Taiwan Patent Application No. 113142542, dated Aug. 15, 2025, 22 pages of Examiner's tentative rejection and no page of translation available.

"3rd Generation Partnership Project; Technical Specification Group Radio Access Network; NR; Requirements for support of radio resource management (Release 18)", 3GPP TS 38.133 V18.6.0, Jun. 2024, 7229 pages.

Extended European Search Report received for corresponding European Patent Application No. 24206338.6, dated Mar. 24, 2025, 12 pages.

"Improvement on Scell/SCG setup delay", 3GPP TSG RAN WG4 Meeting #107, R4-2308822, Ericsson, Agenda: 8.25.4, May 22-26, 2023, 8 Pages.

International Search Report and Written Opinion received for corresponding Patent Cooperation Treaty Application No. PCT/EP2024/080031, dated Jan. 14, 2025, 12 pages.

"GNSS operation enhancement in Rel-18 IoT NTN", 3GPP TSG-RAN WG2 Meeting #123, Agenda: 7.6.2.2, Nokia, Aug. 21-25, 2023, 12 pages.

International Search Report and Written Opinion received for corresponding Patent Cooperation Treaty Application No. PCT/EP2024/078355, dated Jan. 20, 2025, 15 pages.

"Email discussion summary for [104-bis-e][223] NR_Mob_enh2_part2", 3GPP TSG-RAN WG4 Meeting # 104-bis-e, Agenda: 6.20.2, Apple, Oct. 10-19, 2022, 38 pages.

"Discussion on improvement on SCell/SCG setup delay", 3GPP TSG-RAN WG4 Meeting #109, R4-2319083, Agenda: 8.24.2.3, CMCC, Nov. 13-17, 2023, 6 Pages.

"Discussion on improvements on SCell/SCG setup delay", 3GPP TSG-RAN WG2 Meeting #123bis, R2-2310796, Nokia, Agenda: 7.4.5, Oct. 9-13, 2023, 80 Pages.

International Search Report and Written Opinion received for corresponding Patent Cooperation Treaty Application No. PCT/EP2024/079454, dated Jan. 28, 2025, 13 pages.

* cited by examiner

100

110

120

2

RRC_CONNECTED — 201

Resume

Release with suspend

RRC_INACTIVE

Release

202  Release

Establish

RRC_IDLE — 203

304

301          302          303

| CONNECTED | RRC IDLE/INACTIVE | RRC | CONNECTED |

304

301          305          306          307

| CONNECTED | RRC IDLE/INACTIVE | RRC | CONNECTED |

4

| UE 100 | Cell 110 | Cell 120 |

401. UE in connected mode

402. RRC Connection Release

403. UE in idle/inactive mode

404. SIB

405. Determine whether to follow modified configuration

406. Validating measurements

407. Re-establish connection and report validated measurements

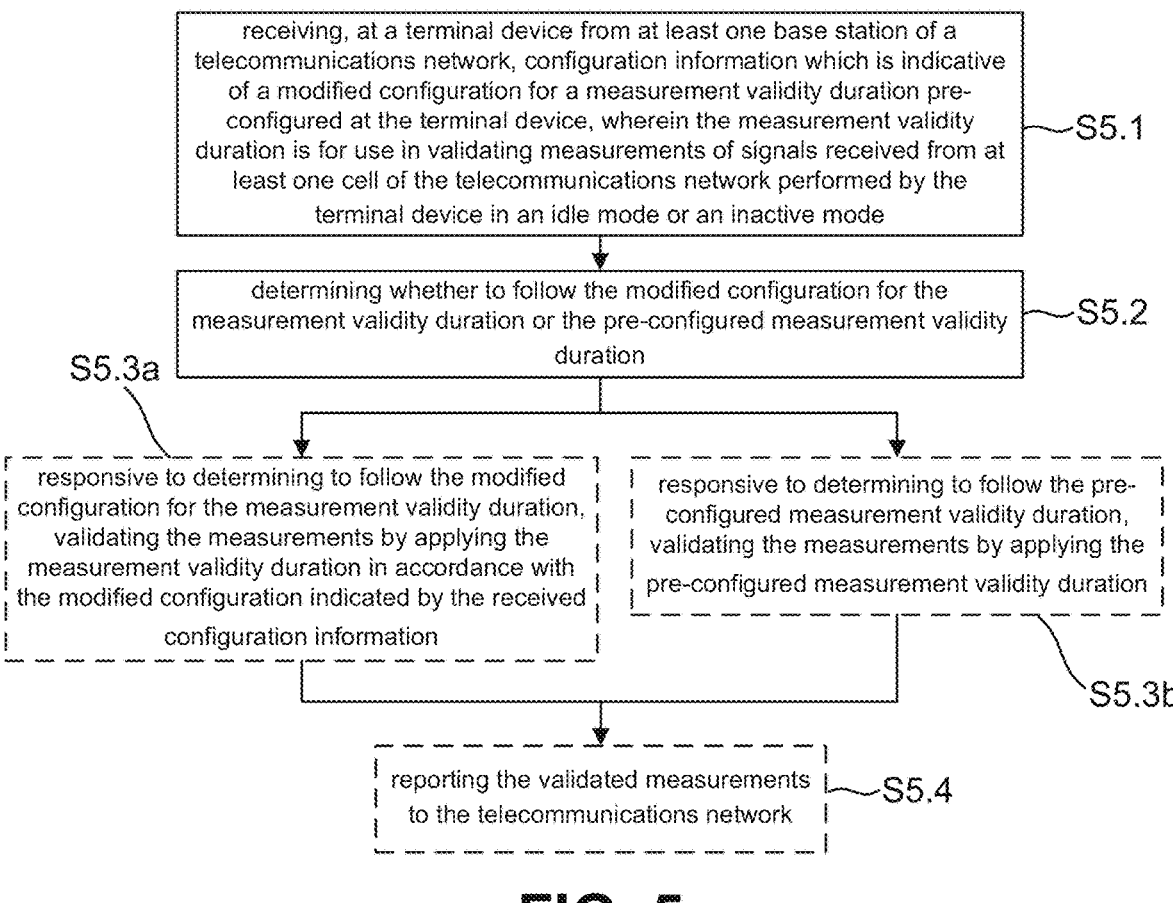

receiving, at a terminal device from at least one base station of a telecommunications network, configuration information which is indicative of a modified configuration for a measurement validity duration pre-configured at the terminal device, wherein the measurement validity duration is for use in validating measurements of signals received from at least one cell of the telecommunications network performed by the terminal device in an idle mode or an inactive mode ⎯S5.1 determining whether to follow the modified configuration for the measurement validity duration or the pre-configured measurement validity duration ⎯S5.2

S5.3a responsive to determining to follow the modified configuration for the measurement validity duration, validating the measurements by applying the measurement validity duration in accordance with the modified configuration indicated by the received configuration information responsive to determining to follow the pre-configured measurement validity duration, validating the measurements by applying the pre-configured measurement validity duration S5.3b reporting the validated measurements to the telecommunications network ⎯S5.4

FIG. 5 determining whether to apply a measurement validity duration for use in validating measurements of signals received from at least one cell of the telecommunications network performed by the terminal device in an idle mode or an inactive mode. ⎯S6.1 validating the measurements without applying the measurement validity duration ⎯S6.2 reporting the validated measurements to the telecommunications network ⎯S6.3

FIG. 6

METHODS AND APPARATUSES RELATING TO WIRELESS COMMUNICATION

FIELD

This specification relates generally to wireless communication.

BACKGROUND

Terminal devices, sometimes referred to as 'user equipment' (UE), can communicate wirelessly with other terminal devices and/or base stations. Such communication may facilitate a variety of tasks.

SUMMARY

In a first aspect, this specification describes a terminal device comprising: means for receiving, at the terminal device from at least one base station of a telecommunications network, configuration information which is indicative of a modified configuration for a measurement validity duration pre-configured at the terminal device, wherein the measurement validity duration is for use in validating measurements of signals received from at least one cell of the telecommunications network performed by the terminal device in an idle mode or an inactive mode; and means for determining whether to follow the modified configuration for the measurement validity duration or the pre-configured measurement validity duration.

In some examples, the terminal device further comprises: means for, responsive to determining to follow the modified configuration for the measurement validity duration, validating the measurements by applying the measurement validity duration in accordance with the modified configuration indicated by the received configuration information; and means for reporting the validated measurements to the telecommunications network. In addition or alternatively, the terminal device may further comprise: means for, responsive to determining to follow the pre-configured measurement validity duration, validating the measurements by applying the pre-configured measurement validity duration; and means for reporting the validated measurements to the telecommunications network.

In some examples, the pre-configured measurement validity duration comprises a first measurement validity duration received at the terminal device from the at least one base station of the telecommunications network, wherein the modified configuration for the measurement validity duration indicated by the received configuration information comprises a second measurement validity duration and indicates that the second measurement validity duration overrides the first measurement validity duration, and wherein the means for determining are configured to follow the modified configuration for the measurement validity duration by using the second measurement validity duration for validation of the measurements. In other examples, the pre-configured measurement validity duration comprises a first measurement validity duration received at the terminal device from the at least one base station of the telecommunications network, and wherein the modified configuration for the measurement validity duration indicated by the received configuration information comprises a second measurement validity duration and indicates that the first measurement validity duration overrides the second measurement validity duration, and wherein the means for determining are configured to follow the pre-configured measurement validity duration by using the first measurement validity duration for validation of the measurements. In some such examples, the first measurement validity duration is included in a radio resource control, RRC, message received at the terminal device from the at least one base station of the telecommunications network, and/or the second measurement validity duration is included in a system information block, SIB, message received at the terminal device from the at least one base station of the telecommunications network.

In some examples, the measurements are determined to be valid when they are performed by the terminal device during a time interval corresponding to the measurement validity duration which ends at a measurement reporting time. In other examples, the configuration information comprises an evaluation reference time, and the terminal device is configured to determine that the measurements are valid when they are performed by the terminal device during a time interval corresponding to the measurement validity duration which ends at the evaluation reference time. In some such examples, the evaluation reference time corresponds to the terminal device receiving at least one of: a paging message and a User Equipment, UE, Information Request message, or to the terminal device transmitting at least one of: a Radio Resource Control, RRC, Resume Complete message, a RRC Setup Complete message and a UE Information Response message.

In some examples, the configuration information comprises a flag which indicates whether the measurement validity duration should be used for validating the measurements, and the means for determining whether to follow the modified configuration for the measurement validity duration or the pre-configured measurement validity duration are configured to perform the determination based on the flag included in the configuration information. In addition or alternatively, the configuration information may indicate that the pre-configured measurement validity duration should be applied for measurements performed by the terminal device in one of the idle mode and the inactive mode and further indicates that the modified configuration for the measurement validity duration should be applied for measurements performed by the terminal device in the other of the idle mode and the inactive mode, wherein the means for determining are configured to determine to follow the pre-configured measurement validity duration for validation of measurements performed by the terminal device in the one of the idle mode and inactive mode, and wherein the means for determining are configured to determine to follow the modified configuration for the measurement validity duration for validation of measurements performed by the terminal device in the other of the idle mode and inactive mode. In addition or alternatively, the configuration information may be received at the terminal device from the at least one base station of the telecommunications network in at least one of: a system information block, SIB, message, a radio resource control, RRC, message, and/or a medium access control, MAC, message.

In a second aspect, this specification describes a network node comprising: means for transmitting, to a terminal device, configuration information which is indicative of a modified configuration for a measurement validity duration which is pre-configured at the terminal device, wherein the measurement validity duration is for use in validating measurements of signals received from at least one cell of a telecommunications network performed by the terminal device in an idle mode or an inactive mode. In some examples, the network node further comprises means for receiving, from the terminal device, validated measurements of signals received from the at least one cell of the telecommunications network performed by the terminal device in an idle mode or an inactive mode. In addition or alternatively, the configuration information may be transmitted to the terminal device in at least one of: system information block, SIB, message, a radio resource control, RRC, message, and/or a medium access control, MAC, message.

In a third aspect, this specification describes an apparatus (e.g. a terminal device) comprising at least one processor and at least one memory storing instructions that, when executed by the at least one processor, cause the apparatus at least to perform operations comprising: receiving, at a terminal device from at least one base station of a telecommunications network, configuration information which is indicative of a modified configuration for a measurement validity duration pre-configured at the terminal device, wherein the measurement validity duration is for use in validating measurements of signals received from at least one cell of the telecommunications network performed by the terminal device in an idle mode or an inactive mode; and determining whether to follow the modified configuration for the measurement validity duration or the pre-configured measurement validity duration.

In some examples, the operations further comprise: responsive to determining to follow the modified configuration for the measurement validity duration, validating the measurements by applying the measurement validity duration in accordance with the modified configuration indicated by the received configuration information; and reporting the validated measurements to the telecommunications network. In addition or alternatively, the operations may further comprise: responsive to determining to follow the pre-configured measurement validity duration, validating the measurements by applying the pre-configured measurement validity duration; and reporting the validated measurements to the telecommunications network.

In some examples, the pre-configured measurement validity duration comprises a first measurement validity duration received at the terminal device from the at least one base station of the telecommunications network, wherein the modified configuration for the measurement validity duration indicated by the received configuration information comprises a second measurement validity duration and indicates that the second measurement validity duration overrides the first measurement validity duration, and wherein the means for determining are configured to follow the modified configuration for the measurement validity duration by using the second measurement validity duration for validation of the measurements. In other examples, the pre-configured measurement validity duration comprises a first measurement validity duration received at the terminal device from the at least one base station of the telecommunications network, and wherein the modified configuration for the measurement validity duration indicated by the received configuration information comprises a second measurement validity duration and indicates that the first measurement validity duration overrides the second measurement validity duration, and wherein the means for determining are configured to follow the pre-configured measurement validity duration by using the first measurement validity duration for validation of the measurements. In some such examples, the first measurement validity duration is included in a radio resource control, RRC, message received at the terminal device from the at least one base station of the telecommunications network, and/or the second measurement validity duration is included in a system information block, SIB, message received at the terminal device from the at least one base station of the telecommunications network.

In some examples, the measurements are determined to be valid when they are performed by the terminal device during a time interval corresponding to the measurement validity duration which ends at a measurement reporting time. In other examples, the configuration information comprises an evaluation reference time, and the terminal device is configured to determine that the measurements are valid when they are performed by the terminal device during a time interval corresponding to the measurement validity duration which ends at the evaluation reference time. In some such examples, the evaluation reference time corresponds to the terminal device receiving at least one of: a paging message and a User Equipment, UE, Information Request message, or to the terminal device transmitting at least one of: a Radio Resource Control, RRC, Resume Complete message, a RRC Setup Complete message and a UE Information Response message.

In some examples, the configuration information comprises a flag which indicates whether the measurement validity duration should be used for validating the measurements, and the determining whether to follow the modified configuration for the measurement validity duration or the pre-configured measurement validity duration is performed based on the flag included in the configuration information. In addition or alternatively, the configuration information may indicate that the pre-configured measurement validity duration should be applied for measurements performed by the terminal device in one of the idle mode and the inactive mode and further indicates that the modified configuration for the measurement validity duration should be applied for measurements performed by the terminal device in the other of the idle mode and the inactive mode, wherein the means for determining are configured to determine to follow the pre-configured measurement validity duration for validation of measurements performed by the terminal device in the one of the idle mode and inactive mode, and wherein the means for determining are configured to determine to follow the modified configuration for the measurement validity duration for validation of measurements performed by the terminal device in the other of the idle mode and inactive mode. In addition or alternatively, the configuration information may be received at the terminal device from the at least one base station of the telecommunications network in at least one of: a system information block, SIB, message, a radio resource control, RRC, message, and/or a medium access control, MAC, message.

In a fourth aspect, this specification describes an apparatus (e.g. a network node or base station) comprising at least one processor and at least one memory storing instructions that, when executed by the at least one processor, cause the apparatus at least to perform operations comprising: transmitting, to a terminal device by a network node, configuration information which is indicative of a modified configuration for a measurement validity duration which is pre-configured at the terminal device, wherein the measurement validity duration is for use in validating measurements of signals received from at least one cell of a telecommunications network performed by the terminal device in an idle mode or an inactive mode. In some examples, the operations further comprise means for receiving, from the terminal device, validated measurements of signals received from the at least one cell of the telecommunications network performed by the terminal device in an idle mode or an inactive mode. In addition or alternatively, the configuration information may be transmitted to the terminal device in at least one of: system information block, SIB, message, a radio resource control, RRC, message, and/or a medium access control, MAC, message.

In a fifth aspect, this specification describes a method comprising: receiving, at a terminal device from at least one base station of a telecommunications network, configuration information which is indicative of a modified configuration for a measurement validity duration pre-configured at the terminal device, wherein the measurement validity duration is for use in validating measurements of signals received from at least one cell of the telecommunications network performed by the terminal device in an idle mode or an inactive mode; and determining whether to follow the modified configuration for the measurement validity duration or the pre-configured measurement validity duration.

In some examples, the method further comprises: responsive to determining to follow the modified configuration for the measurement validity duration, validating the measurements by applying the measurement validity duration in accordance with the modified configuration indicated by the received configuration information; and reporting the validated measurements to the telecommunications network. In addition or alternatively, the method may further comprise: responsive to determining to follow the pre-configured measurement validity duration, validating the measurements by applying the pre-configured measurement validity duration; and reporting the validated measurements to the telecommunications network.

In some examples, the pre-configured measurement validity duration comprises a first measurement validity duration received at the terminal device from the at least one base station of the telecommunications network, wherein the modified configuration for the measurement validity duration indicated by the received configuration information comprises a second measurement validity duration and indicates that the second measurement validity duration overrides the first measurement validity duration, and wherein the means for determining are configured to follow the modified configuration for the measurement validity duration by using the second measurement validity duration for validation of the measurements. In other examples, the pre-configured measurement validity duration comprises a first measurement validity duration received at the terminal device from the at least one base station of the telecommunications network, and wherein the modified configuration for the measurement validity duration indicated by the received configuration information comprises a second measurement validity duration and indicates that the first measurement validity duration overrides the second measurement validity duration, and wherein the means for determining are configured to follow the pre-configured measurement validity duration by using the first measurement validity duration for validation of the measurements. In some such examples, the first measurement validity duration is included in a radio resource control, RRC, message received at the terminal device from the at least one base station of the telecommunications network, and/or the second measurement validity duration is included in a system information block, SIB, message received at the terminal device from the at least one base station of the telecommunications network.

In some examples, the measurements are determined to be valid when they are performed by the terminal device during a time interval corresponding to the measurement validity duration which ends at a measurement reporting time. In other examples, the configuration information comprises an evaluation reference time, and the terminal device is configured to determine that the measurements are valid when they are performed by the terminal device during a time interval corresponding to the measurement validity duration which ends at the evaluation reference time. In some such examples, the evaluation reference time corresponds to the terminal device receiving at least one of: a paging message and a User Equipment, UE, Information Request message, or to the terminal device transmitting at least one of: a Radio Resource Control, RRC, Resume Complete message, a RRC Setup Complete message and a UE Information Response message.

In some examples, the configuration information comprises a flag which indicates whether the measurement validity duration should be used for validating the measurements, and the determining whether to follow the modified configuration for the measurement validity duration or the pre-configured measurement validity duration is performed based on the flag included in the configuration information. In addition or alternatively, the configuration information may indicate that the pre-configured measurement validity duration should be applied for measurements performed by the terminal device in one of the idle mode and the inactive mode and further indicates that the modified configuration for the measurement validity duration should be applied for measurements performed by the terminal device in the other of the idle mode and the inactive mode, wherein the means for determining are configured to determine to follow the pre-configured measurement validity duration for validation of measurements performed by the terminal device in the one of the idle mode and inactive mode, and wherein the means for determining are configured to determine to follow the modified configuration for the measurement validity duration for validation of measurements performed by the terminal device in the other of the idle mode and inactive mode. In addition or alternatively, the configuration information may be received at the terminal device from the at least one base station of the telecommunications network in at least one of: a system information block, SIB, message, a radio resource control, RRC, message, and/or a medium access control, MAC, message.

In a sixth aspect, this specification describes a method comprising: transmitting, to a terminal device by a network node, configuration information which is indicative of a modified configuration for a measurement validity duration which is pre-configured at the terminal device, wherein the measurement validity duration is for use in validating measurements of signals received from at least one cell of a telecommunications network performed by the terminal device in an idle mode or an inactive mode. In some examples, the method further comprises means for receiving, from the terminal device, validated measurements of signals received from the at least one cell of the telecommunications network performed by the terminal device in an idle mode or an inactive mode. In addition or alternatively, the configuration information may be transmitted to the terminal device in at least one of: system information block, SIB, message, a radio resource control, RRC, message, and/or a medium access control, MAC, message.

In a seventh aspect, this specification describes a method comprising: transmitting to a terminal device or receiving at the terminal device, configuration information which is indicative of a modified configuration for a measurement validity duration which is pre-configured at the terminal device, wherein the measurement validity duration is for use in validating measurements of signals received from at least one cell of a telecommunications network performed by the terminal device in an idle mode or an inactive mode.

In an eighth aspect, this specification describes a non-transitory computer readable medium comprising program instructions stored thereon for performing at least any of the operations described above with reference to the fifth to seventh aspects.

BRIEF DESCRIPTION OF FIGS.

For a better understanding of the present application, reference will now be made by way of example only to the accompanying drawings in which:

FIGS. 5 and 6 are flowcharts illustrating various operations which may be performed in accordance with examples described herein;

DETAILED DESCRIPTION

Figure 1:
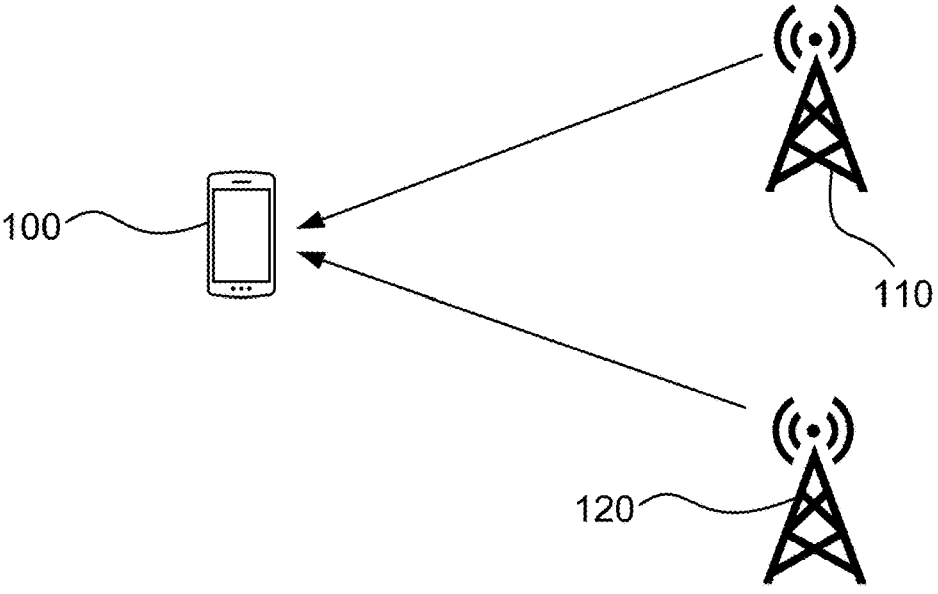
FIG. 1 is an example illustrating communications between a terminal device and a plurality of base stations.

In the description and drawings, like reference numerals refer to like elements throughout.

In modern telecommunications networks, terminal devices may perform measurements of signals received from one or more cells of the network. In the example of FIG. 1, terminal device 100 is depicted together with cells 110 and 120. By way of example only, terminal device 100 is depicted as a smartphone and cells 110 and 120 are depicted as base stations.

The network may configure terminal device 100 to perform measurements of signals received from one or more cells of the network. For instance, terminal device 100 may be configured to perform measurements of carrier signals received from one or more neighbouring cells. Such measurements may be reported to the network to facilitate the performance of various network tasks, such as choosing a target cell for cell reselection or making a handover decision.

At any given time, a terminal device, such as terminal device 100, may be operating in one of a number of modes. For instance, these operating modes (or 'states') may comprise an idle mode, an inactive mode and/or a connected mode. These modes are described in greater detail below with reference to FIG. 2. A terminal device operating in the idle or inactive mode may perform measurements of signals received from one or more cells of the network (e.g. carrier measurements), such as measurements for use in a cell reselection process. Usually, these measurements are validated and reported to the network upon transition into a connected mode. This process may be referred to as early measurement reporting (EMR). The EMR may facilitate establishment of a carrier aggregation or dual connectivity for transitioning the terminal device from the inactive mode to the connected mode.

Measurements performed by a terminal device may be deemed valid if the measurement results satisfy a given measurement accuracy, such as a requirement that a certain number of samples be measured in specific radio conditions. In addition or alternatively, measurements may be validated using a measurement validity duration. In this case, measurements are deemed valid when they are performed a time interval defined using the measurement validity duration. For instance, if the measurement validity duration is given by X, measurements may be considered valid if they are performed within the last [X] seconds before the measurements are reported to the network. The measurement validity duration (i.e. X) may be configured by the network (e.g. in an RRC message).

However, validating measurements using the measurement validity duration in this manner is dependent upon the point in time at which the measurements are reported to the network (the 'reporting occasion'). As such, using a single, fixed value for the measurement validity duration may not be appropriate for all possible network conditions that may be encountered by the terminal device. Put another way, use of a global value for the measurement validity duration for validation of all measurements does not allow the validation procedure to adapt to different terminal device deployment scenarios. As will be appreciated, use of a single, fixed configuration for the measurement validity duration may not be optimal for terminal device measurement reporting performance, and may cause degradation of terminal device power saving and/or network performance (e.g. by causing too many or too few measurements to be performed/validated by the terminal device).

It may therefore be beneficial for the measurement validity duration to be configurable by the network, not least to facilitate a reduction in power consumption when the terminal device is operating in an idle or inactive mode. Implementations of the technology described herein may allow the network to configure the measurement validity duration for use in validating measurements performed by a terminal device.

Various aspects of the technology described herein relate to receiving, at a terminal device from at least one base station of a telecommunications network, configuration information which is indicative of a modified configuration for a measurement validity duration pre-configured at the terminal device, wherein the measurement validity duration is for use in validating measurements of signals received from at least one cell of the telecommunications network performed by the terminal device in an idle mode or an inactive mode; and determining whether to follow the modified configuration for the measurement validity duration or the pre-configured measurement validity duration. Other aspects of the technology described herein relate to a network node transmitting, to a terminal device, configuration information which is indicative of a modified configuration for a measurement validity duration which is pre-configured at the terminal device, wherein the measurement validity duration is for use in validating measurements of signals received from at least one cell of a telecommunications network performed by the terminal device in an idle mode or an inactive mode.

As described in greater detail below with reference to FIG. 1, various implementations of the technology described herein may facilitate configuration of a measurement validity duration for validation of terminal device measurements performed in an idle or inactive mode, such as EMR measurements. As mentioned above, this may contribute to an improvement in network performance. When configuring a measurement validity duration that is shorter than a default measurement validity duration, a reduction of power consumption at a terminal device may be achieved. When configuring a measurement validity duration that is longer than the default measurement validity duration, it may be ensured that a sufficient number of measurement occasions can be obtained, thus improving decision-making based on the measurements.

There are a variety of different implementation options for the performance and validation of measurements by terminal devices. Various aspects of the technology described herein may be particularly beneficial in the situation in which terminal devices take into account non-3GPP sensory data when performing and/or validating measurements, such as data from additional sensor(s) of the terminal device which are not visible to 3GPP procedures. Such sensory data may be positioning data acquired from a global navigation satellite system or a motion sensor such as an inertial sensor, or a proximity sensor detecting hand position/blocking on a device, for example. In this situation, network-side configuration of the measurement validity duration for use by the terminal device in validating measurements may avoid degradations in network performance and/or terminal device power consumption.

Further aspects of the technology described herein relate to a terminal device determining whether to apply a measurement validity duration for use in validating measurements of signals received from at least one cell of the telecommunications network performed by the terminal device in an idle mode or an inactive mode. This may further contribute to the aforementioned increases in network performance and/or reduction in terminal device power consumption.

In some examples, the term 'terminal device' or 'user equipment' may refer to any device employed by a user to communicate. Whilst the terminal device of FIG. 1 is depicted as a mobile telephone or 'smartphone', it will of course be appreciated that terminal devices may comprise various other devices, including, but not limited to laptops, smartwatches, tablet computers and vehicle-based terminal devices, such as those mounted on cars, buses, uncrewed aerial vehicles (UAVs), aeroplanes, trains, or boats. Alternatively, mobile terminal devices may be carried by a user, or worn on their person.

In some examples, the term 'measurements' may refer to measurements, performed by a terminal device, of signals received from one or more cells of the network. For instance, each measurement may comprise a measurement of a carrier signal (e.g. a NR and/or E-UTRA carrier) received from a given cell. Based on such measurements, the terminal device and/or the network is able to make a determination as to the most suitable cells for handover and/or reselection. In some examples, a measurement may be deemed to be of a sufficient quality when a certain number of samples of the respective carrier signal are measured. In the context of EMR, measurements performed in the idle or inactive mode are reported to the network after transition to a connected mode, e.g. once the connection has been made secure. When reporting such measurements to the network, measurements may be associated with a Physical Cell ID (PCI) which indicates which cell they correspond to. As described below with reference to FIG. 1, the terminal device may validate measurements prior to reporting them to the network.

10

Figure 2:
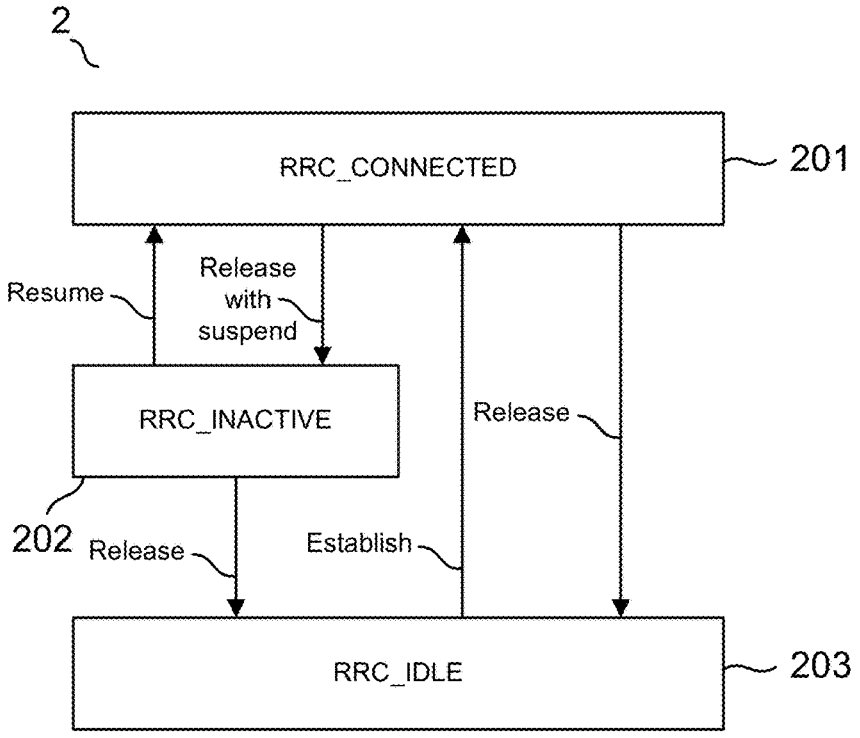
FIG. 2 is a schematic illustration of operating modes of a terminal device.

In some examples, the term 'terminal device operating mode' may refer to one of a number of modes (or 'states') that a terminal device, such as terminal device 100, may be operating in at a given time. For instance, as depicted in FIG. 2, these operating modes, indicated generally by the reference numeral 2, may comprise a connected mode 201 ('RRC_CONNECTED'), an inactive mode 202 ('RRC_INACTIVE') and an idle mode 203 ('RRC_IDLE'). This particular terminology referring to the RRC operating modes follows the 3GPP specifications. Other systems may use another terminology but, generally, a connected mode refers to mode where a communication connection has been established between the terminal device and an access node such as a base station operating a cell. The establishment may include establishing a configuration, identification, and/or security key features for the connection at the terminal device and at the access node. The idle mode refers to a mode where such a connection does not exist, e.g. has been terminated. The inactive mode conventionally refers to a mode where the connection does exist but is in a standby or power-save state, called inactive mode. The measurements performed on these stand-by or power saving modes may depend on specification generation and new power saving states may be considered in the future. Responsive to receiving a message from the network (e.g. a Radio Resource Control, RRC, message), terminal device may transition from one mode to another. Various examples of such transitions are given below.

As will be appreciated, whilst 5G terminology is used for the operating modes in this specification, other naming conventions may be used for similar or equivalent modes in 6G and beyond. Various aspects of the technology described herein may be applicable for terminal devices employing such modes.

In the connected mode 201, the terminal device is connected to a cell of the network (i.e. an RRC connection has been established). In this mode, responsive to receipt of release message (e.g. an 'RRCRelease' message), the terminal device may transition to the idle mode. Similarly, responsive to receipt of a release with suspend message (e.g. an 'RRCRelease' message with a 'suspend' configuration), the terminal device may transition to the inactive mode.

In the inactive mode 202, the terminal device maintains a limited level of connectivity to a cell of the network so as to reduce network signalling load. As compared to the idle mode, the inactive mode may enable reduced latency when transitioning to the connected mode. In the inactive mode, responsive to receipt of a release message (e.g. an 'RRCRelease' message), the terminal device may transition to the idle mode. On the other hand, responsive to receipt of a resume message (e.g. an 'RRCResume' message), the terminal device may transition to the connected mode.

In the idle mode 203, the terminal device is not connected to a particular cell of the network. As a result of the mobility of the terminal device during the idle mode, the terminal device may change the cell where it camps via cell reselection. In the idle mode, responsive to receipt of an establish message (e.g. an 'RRCSetup' message), the terminal device may transition to the connected mode.

It will be appreciated that, when a terminal device is handed over from one cell to another, or when cell reselection is performed, other transitions may be possible. For instance, in a handover scenario, the terminal device may transition directly from a connected mode for a first cell to a connected mode for the second cell. On the other hand, in a cell reselection scenario, the terminal device may transition from an idle or inactive mode for a first cell to an idle or inactive mode for a second cell. Other modes and/or transitions may be apparent to the skilled reader.

Various methods and apparatuses are described in detail below, by way of example only, in the context of a cellular network, such as an Evolved Universal Terrestrial Radio Access (E-UTRA) network or a 5G network. However, it will be appreciated that the techniques may be applicable with communications networks of other types (e.g. but not limited to other types of cellular network). Cellular networks may comprise one or more base stations, sometimes referred to as transmit-receive points (TRPs) or access points (e.g. but not limited to gNBs and/or eNBs). Whilst only two base stations are depicted in FIG. 1, a radio access network (RAN, NG-RAN) may typically comprise thousands of such base stations. Together, the base stations may provide cellular network coverage to one or more terminal devices over a wide geographical area.

Although by no means limited to such an implementation, the examples of the technology described herein may readily be integrated into any New Radio (NR) terminal device which performs measurements of signals received from one or more cells of the network, such as early measurement reporting (EMR) measurements (e.g. as standardised in 3GPP Release 16). Furthermore, examples of the technology described herein may be compliant with future enhancements to EMR behaviour which are expected to be specified in 3GPP Release 18.

In some implementations and, for instance, depending on the characteristics of the cellular network, the base stations and terminal devices within the network may be configured to communicate with one another, for instance, using an OFDM-based communication scheme, such as orthogonal frequency-division multiple access (OFDMA), single carrier frequency-division multiple access (SC-FDMA), and/or cyclic prefix orthogonal frequency-division multiple access (CP-OFDMA).

As mentioned above, FIG. 1 depicts a terminal device 100 together with cells 110 and 120. In the example of FIG. 1, while operating in an idle or inactive mode, terminal device 100 performs measurements of signals received from cells 110 and 120. For instance, these measurements may be for use in transitioning the terminal device to a connected mode (e.g. as part of a cell reselection process). The signals, which are denoted by arrows in FIG. 1, may comprise carrier signals. In such examples, each of the carrier signals may be identifiable as coming from a particular cell. As will be appreciated, the signal measurements may comprise any one or a combination of signal strength measurements and signal quality measurements.

The measurements performed while the terminal device is operating in an idle or inactive mode may comprise cell reselection measurements and/or early measurement reporting, EMR, measurements.

Terminal device 100 receives configuration information from at least one base station of a telecommunications network (e.g. via cell 110 or cell 120). The configuration information is indicative of a modified configuration for a measurement validity duration (i.e. an X value as described above) that is pre-configured at the terminal device. In this example, the measurement validity duration is for use by terminal device 100 in validating measurements of signals received from at least one cell of the telecommunications network (e.g. cell 110 or cell 120) that are performed by the terminal device while operating in an idle mode or an inactive mode.

In some examples, the configuration information may be included in an RRC message (e.g. an RRCRelease message)

transmitted by at least one base station of the network for reception at the terminal device. In other examples, the configuration information is received at the terminal device from the at least one base station of the telecommunications network in a system information block, SIB, message or a master information block, MIB, message. In yet other examples, the configuration information may be included in a medium access control, MAC, message (i.e. an in-band control message or 6G control message) received at the terminal device from the network.

In some examples, which are described in greater detail below, multiple sets of configuration information may be received at the terminal device, each being indicative of a respective configuration for the measurement validity duration. For instance, such configurations may be received in any one of or any combination of RRC, SIB and MAC, or other in-bandmessages. The configuration information received at the terminal device may indicate whether a given configuration overrides or, alternatively, is overridden by other configuration for the measurement validity duration. In this way, and by way of example only, the network is able to implicitly or explicitly override the SIB message configuration for the measurement validity duration via the RRCRelease configuration, or vice versa.

Having received the configuration information, terminal device 100 determines whether to follow the modified configuration for the measurement validity duration or the pre-configured measurement validity duration. Responsive to determining to follow the modified configuration for the measurement validity duration, terminal device 100 may validate the measurements by applying the measurement validity duration in accordance with the modified configuration indicated by the received configuration information. On the other hand, responsive to determining to follow the pre-configured measurement validity duration, terminal device 100 may validate the measurements by applying the pre-configured measurement validity duration. Having validated the measurements using the modified configuration for the measurement validity duration or the existing configuration (i.e. the configuration indicated by the pre-configured value for the measurement validity duration), terminal device 100 may report the validated measurements to the telecommunications network.

As mentioned above, configurations for the measurement validity duration at the terminal device may override one another. For instance, the pre-configured measurement validity duration may comprise a first measurement validity duration received at the terminal device from the at least one base station of the telecommunications network, and the modified configuration for the measurement validity duration indicated by the configuration information received from the network may comprise a second measurement validity duration. In some examples, the configuration information received from the network and/or the modified configuration indicated by that information may indicate that the second measurement validity duration overrides the first measurement validity duration. In this case, the terminal device is configured to follow the modified configuration for the measurement validity duration by using the second measurement validity duration for validation of the measurements. In other examples, the configuration information received from the network and/or the modified configuration indicated by that information may indicate that the first measurement validity duration overrides the second measurement validity duration. In this case, the terminal device is configured to follow the pre-configured measurement validity duration (i.e. to use the existing configuration) by using the first measurement validity duration for validation of the measurements.

In some examples, the first measurement validity duration is included in a radio resource control, RRC, message received at the terminal device from the at least one base station of the telecommunications network. In addition or alternatively, the second measurement validity duration is included in a system information block, SIB, message received at the terminal device from the at least one base station of the telecommunications network.

Put another way, various aspects of the technology described herein may allow for configuration of the measurement validity duration via multiple types of message (e.g. RRC and SIB messages). In this way, adjustments to the configuration of the measurement validity duration at the terminal device can be dynamically introduced responsive to changing conditions the cell or cells that the terminal device is entering from the idle or inactive mode.

As described below, the configurations received at the terminal device could be confined to certain terminal device operating modes. For instance, configurations received in SIB messages could be used to overwrite measurement validity duration configurations used for validation of measurements performed in one of the idle or inactive mode, whilst configurations received via RRC may be used for validating measurements performed in the other of idle or inactive mode.

Put another way, the configuration information may indicate that the pre-configured measurement validity duration should be applied for measurements performed by the terminal device in one of the idle mode and the inactive mode and further indicates that the modified configuration for the measurement validity duration should be applied for measurements performed by the terminal device in the other of the idle mode and the inactive mode. In this case, the terminal device is configured to follow the pre-configured measurement validity duration for validation of measurements performed by the terminal device in the one of the idle mode and inactive mode and to follow the modified configuration for the measurement validity duration for validation of measurements performed by the terminal device in the other of the idle mode and inactive mode. Put yet another way, the terminal device may be configured using independent X values, using one for measurements performed in the idle mode and another for measurements performed in the inactive mode. One of these X values (e.g. for idle mode) could be configured solely via SIB signalling and another (e.g. for inactive mode) may be configured via dedicated signalling.

Generally, the pre-configured measurement validity duration and the measurement validity duration indicated in the configuration information may both be valid, just under different operating conditions of the terminal device. So on the basis of the prevailing operating conditions, the terminal device may select either the pre-configured measurement validity duration or the measurement validity duration received in the configuration information. Under first operating conditions, the terminal device may select and apply the pre-configured measurement validity duration, and under second operating conditions different or mutually exclusive with the first operating conditions, the terminal device may select the measurement validity duration received in the configuration information.

In some examples, measurements are determined to be valid when they are performed by the terminal device during a time interval corresponding to the measurement validity duration which ends at a measurement reporting time. This situation is described in detail below with reference to FIG. 3A.

In other examples, the wherein the configuration information comprises an evaluation reference time for use together with the measurement validity duration when validating the measurements. In this case, the terminal device is configured to determine that the measurements are valid when they are performed by the terminal device during a time interval corresponding to the measurement validity duration which ends at the evaluation reference time. Put another way, the evaluation reference time included in the configuration information may constitute a 'hypothetical report occasion' which is used in place of the 'real' reporting occasion (i.e. the point in time at which measurement results are reported to the network) and which may be configured and/or determined and/or configured independently of the actual reporting occasion. The evaluation reference time is described in detail below with reference to FIG. 3B.

In some examples, the configuration information comprises a flag, or a field in configuration object, which indicates whether the measurement validity duration should be used for validating the measurements. In this case, the terminal device determines whether to follow the modified configuration for the measurement validity duration or the pre-configured measurement validity duration based on the flag included in the configuration information. Put another way, the configuration for the measurement validity duration may include an RRC-configurable flag, which enables/disables validation using the measurement validity duration. When this flag indicates that the measurement validity duration is disabled, validation of the measurements (that is, measurements that were performed while the terminal device is in the idle or inactive mode) is performed according to internal terminal device measurement validation criteria. Put yet another way, the terminal device may be configured with a flag via a message from the network (e.g. an RRC Release or RRC Reconfiguration message). When this flag is set to true, the terminal device may report to the network measurements which were performed outside of the time interval defined by the measurement validity duration, that is to say, measurements that would otherwise have been deemed to have failed validation. However, it may be required that terminal device measurements meet other requirements before reporting to the network, such as accuracy requirements, despite this flag being enabled. When this flag is set to false, the terminal device makes use of the measurement validation duration when validating measurements as already described. The default value for this flag may be set to false, indicating that the terminal device should apply the measurement validation duration for the purposes of validating measurements performed during operation in the idle or inactive modes. In some examples, the flag may be associated with a new validation mechanism, in which case the flag disables the old validation mechanism (i.e. the measurement validity duration) to prevent undesired UE behaviour.

If the measurement validity duration is not configured or is otherwise configured to be disabled, it may be specified that, apart from the accuracy of the measurements, the validation is left up to UE implementation. Otherwise, the terminal device is configured to use the measurement validity configuration as described above.

To avoid RRCReconfigurations, the network may configure subsequent behaviour for RRCConfiguration. For instance, the terminal device may be configured to maintain the configuration for the measurement validity duration (e.g. as a configuration object). In other words, the rules/configuration associated with a given X value may be stored for use in subsequent measurement validation scenarios.

In accordance with various aspects of the technology described herein, it may be beneficial to provide a means by which the measurement validity duration may be interpreted in different ways, and disabled if required. As mentioned above, various aspects of the technology described herein relate to a terminal device (e.g. terminal device 100) determining whether to apply a measurement validity duration for use in validating measurements of signals received from at least one cell of the telecommunications network performed by the terminal device in an idle mode or an inactive mode.

Responsive to determining to apply the measurement validity duration, the terminal device validates the measurements using the measurement validity duration in the manner described above. Having validated the measurements, the terminal device then reports the measurements to the network.

Responsive to determining not to apply the measurement validity duration, the terminal device validates the measurements without applying the measurement validity duration and reports the validated measurements to the telecommunications network.

To validate the measurements without applying the measurement validity duration, the terminal device may make use of data from at least one sensor of the terminal device. For instance, as described above, terminal devices may have access to non-3GPP sensors. Such sensors may enable to evaluate whether close proximity conditions (e.g. terminal device movement, hand movement, or physical obstacles blocking the signal etc.) and/or mobility conditions have changed. In the case there has been a change in proximity conditions, the terminal device may declare the measurement invalid. This is another example of validation according to terminal device internal validation criteria.

Yet another example of terminal device internal validation criteria involves the terminal device using specific idle or inactive mode measurements of signal level. For instance, signals of above a certain strength may be determined to be valid according to these criteria.

In some examples, the terminal device may determine not to apply the measurement validity duration responsive to the measurement validity duration being of a specific value which indicates that it should not be applied. Put another way, the X value may take a 'special value' which is interpreted by the terminal device as a flag which indicates that the measurement validity duration configuration is disabled. When the X value does not take this special value, it is applied normally (i.e. as described above with reference to the previous FIGS.

For instance, the specific value (or special value) for the measurement validity duration may at least one of: a maximum value for the measurement validity duration (e.g. $X_{max}=0xFFF=4095$), an out-of-range value for the measurement validity duration (e.g. a value which is not included in the RRC Configuration), and/or a spare value for the measurement validity duration (e.g. an RRC Configuration spare value).

Where a special value for the measurement validity duration is used, the terminal device is configured with a rule by which the actual value for the measurement validity duration may be ignored when it takes the special value(s). In this case, the terminal device treats measurements (e.g. of particular carriers) which would otherwise be outside of the interval defined by the X value (i.e. the 'window' described with respect to FIG. 3B) as valid, and reports them to the network. In some examples, internal terminal device validity criteria, such as requiring a certain number of samples for the measurements, may be required to be met before the measurements are reported to the network.

In some examples, the terminal device receives a flag which indicates whether the measurement validity duration should be used for validating the measurements. The determination as to whether the measurement validity duration should be applied is then based on the flag. Put another way, a flag which enables/disables the measurement validity duration may be received at the terminal device.

Alternatively, the network may determine not to configure a terminal device with a measurement validity duration for use in validating measurements of signals received from at least one cell of a telecommunications network performed by the terminal device in an idle mode or an inactive mode. For instance, the network may determine not to configure the terminal device based on a type and/or capability of the terminal device. As will be appreciated, in this situation, measurements received from the terminal device are not validated using the measurement validity duration, but are instead validated according to internal validity criteria of the terminal device as described above.

In other words, the configuration of the measurement validity duration may be disabled by the network. For instance, this disabling may be based on terminal device capabilities and/or chipset model identification. In some examples, rather than disabling the configuration, the network may simply determine not to configure the terminal device with an X value in the first instance (e.g. using RRC signalling).

When the measurement validity duration is not configured or has been disabled, the validation of measurements performed in the idle/inactive mode is dependent on the terminal device implementation (i.e. it is performed according to internal validation criteria).

However, even when the measurement validity duration is not in use, the terminal device may still require that measurement accuracy requirements must be met for a measurement to be reported to the network. Put another way, the SCell setup test must still be passed. Where a flag is used to enable or disable the measurement validity duration configuration, this flag may be based on terminal device capability signalling or based on terminal device type.

In some examples, the terminal device may determine not to apply the measurement validity duration responsive to the terminal device being capable of enhanced measurements.

In this context, the difference between enhanced measurements and existing measurement solution is as follows. When using the existing measurement capability, the terminal device does not perform any additional measurements to validate the measurements, and uses a measurement validity duration for validation instead. For the enhanced measurement capability, the measurement validity duration is not configured because the terminal device is assumed to always be capable of verifying the existing measurements (i.e. those performed in the idle or inactive mode) with new measurements as and when validation is required.

For instance, the terminal device may indicate support for both enhanced and existing measurements, but does not make use of the enhanced measurement procedure. Instead, the terminal device reports to the network that measurements have been performed and validated using the measurement validity duration, even when measurements have not been performed by the terminal device. The 'measured' value indicated to the network in the report may be determined according to internal terminal device logic (e.g. the measurements may be estimated using prediction logic or an artificial intelligence/machine learning model).

By way of example only, the measurement validity duration may be configured to be ten seconds. In this example, the terminal device has performed measurements eleven seconds ago. Considered from the perspective of existing measurement-based validation (e.g. as described above), the measurements would be invalid, and hence not reported to the network. However, a terminal device with enhanced capability may ignore the measurement validity duration, even if it has not performed any additional measurements for the purposes of validating the existing measurements, and may report the existing measurements as enhanced measurement results (e.g. subject to the measurements satisfying terminal device internal validity criteria). Put another the way, the terminal device may intentionally ignore the measurement validity duration and state that it supports enhanced measurements. However, the terminal device may consider the measurements performed eleven seconds ago to be valid without further verification. In this way, results may be reported to the network earlier, e.g. in an RRC Resume Complete message.

In some examples, the terminal device comprises means for modifying a configuration of the measurement validity duration; and means for validating the measurements by applying the modified configuration for the measurement validity duration.

For instance, the terminal device may be able to perform validation using the measurement validity duration in test builds of terminal device software (e.g. terminal device firmware), but this functionality may be disabled in production builds. In testing scenarios, the measurement validity duration may be dynamically modified at the terminal device, allowing for test cases to be checked. When checking a given case, special behaviour may allow the terminal device to make use of particular values for the measurement validity duration based on a terminal device test profile. When not in test conditions, this behaviour may be disabled. In some examples, this behaviour may only be present in the terminal device software release dedicated for testing. For instance, the terminal device software may be compiled using a compiler flag which ensures that this part of the software is not compiled for anything other than test release builds.

In some examples, the terminal device may observe non-3GPP sensors or use operator information to determine whether or not the terminal device is in a testing environment, and dynamically enable this parameter. As will be appreciated, no such behaviour may be observed in release builds (e.g. as used in field deployment), since this behaviour is not compiled.

Figures 3A, 3B, 4:
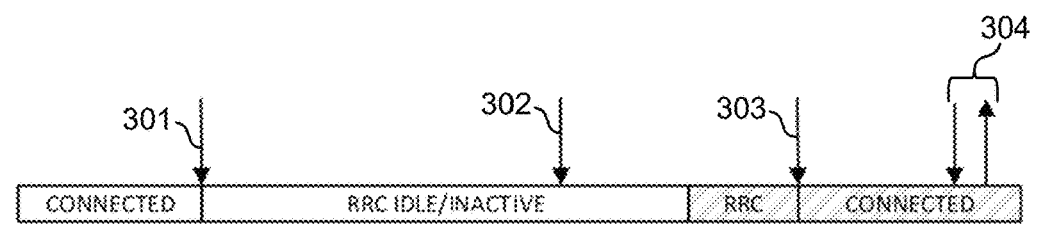
FIGS. 3A and 3B are schematic illustrations of various operation which may be performed in accordance with examples described herein.
FIG. 4 is an example message flow sequence.

FIGS. 3A and 3B depict examples in which a measurement validity duration is used to validate measurements performed while the terminal device is operating in the idle or inactive mode.

It will be appreciated that various operations and entities described with reference to FIGS. 3A and 3B may correspond to operations and entities described with reference to the preceding FIGS. For instance, the terminal device and cells described with reference to FIGS. 3A and 3B may correspond to those described with reference to FIGS. 1 and 2.

In the example of FIG. 3A, at time 301, the terminal device receives an initial configuration for the measurement validity duration. This initial configuration of the measurement validity duration may correspond to the above-mentioned pre-configured measurement validity duration. For instance, this may be included in an RRC Release message which signals the transition of the terminal device from the connected mode to the idle/inactive mode.

At time 302, while operating in the idle/inactive mode, the terminal device receives a new configuration for the measurement validity duration that corresponds to a candidate cell. For instance, this configuration may be received in a SIB message and may be used to validate measurements corresponding to signals (e.g. carrier signals) received from the candidate cell.

Times 303 and 304 may correspond to points in time at which the terminal device is triggered to perform validation of measurements performed in the idle or inactive mode. For instance, time 303 may correspond to receipt of an RRC Setup or RRC Resume message at the terminal device, whilst time 304 may correspond to receipt of an RRC Reconfiguration message at the terminal device. By way of example only, time 304 is also depicted as the actual reporting occasion at which the terminal device transmits the validated results to the network.

In the example of FIG. 3B, the evaluation reference point for the measurement validity duration is configured separately from the reporting occasion. That is, a 'hypothetical reporting occasion' is used, as described above. In this example, the configuration for the measurement validity duration received from the network indicates whether the terminal device should use the hypothetical reference point for anchoring the interval defined by the measurement validity duration or to use the actual reporting occasion instead.

For instance, the configuration may indicate that the evaluation reference point is at time 306. In this case, measurements are determined to be valid when they were performed in the interval of length given by the measurement validity duration and which ends at the evaluation reference point 306. In FIG. 3B, this is given by the validation window between 305 and 306.

In other examples, the evaluation reference point may be configured with an offset. For instance, the same validation window between 305 and 306 may be achieved with a evaluation reference point at time 307 and an offset equal to the difference between time 307 and 306.

When validation is performed using an evaluation reference point, the terminal device stores the results of the validation until the next possible reporting occasion (e.g. time 304), at which point the results are transmitted to the network.

In some examples, the evaluation reference point corresponds to the terminal device receiving at least one of: a paging message and a User Equipment, UE, Information Request message, or to the terminal device transmitting at least one of: a Radio Resource Control, RRC, Resume Complete message, a RRC Setup Complete message and a UE Information Response message. As will be appreciated, the evaluation reference point may be before or after the actual reporting time.

In 'test case' embodiments as described above, configuration of the evaluation reference point may be used to validate the correct operation of the terminal device when validating and reporting measurements.

As with previous examples, measurements may only be reported if they also meet the measurement accuracy requirements (e.g., number of samples in specific radio conditions) at the time of the configured reporting occasion, whether real or hypothetical.

FIG. 4 is a message flow sequence, indicated generally by the reference numeral 4, in accordance with some aspects of the described technology. The message flow sequence 4 shows an example implementation within which aspects of a process, such as that described with reference to FIGS. 1 to 3B, may be performed. In this example, a terminal device 100 is shown in communication with cells 110 and 120.

In general terms, the example of FIG. 4 relates to a procedure for configuring a measurement validity duration at a terminal device and to how the terminal device should make use of the measurement validity duration to validate measurements performed in an idle or inactive operating mode.

It will be appreciated that various operations and entities described with reference to FIG. 4 may correspond to operations and entities described with reference to the preceding FIGS. For instance, the terminal device and cells described with reference to FIG. 4 may correspond to those described with reference to FIGS. 1 to 3B.

It will be further appreciated that various operations described with reference to FIG. 4 may be performed by entities other than those expressly depicted. For instance, some or all of the operations attributed to the terminal device may be performed by another terminal device. Similarly, various operations attributed to cells 110 and 120 may be performed by other network entities, such as a core network (CN) entity, a Radio Access Node, or a base station (e.g. a base station in the serving cell of the terminal device 100).

In operation 401, the terminal device is operating in the connected mode.

In operation 402, the terminal device receives an RRC Connection Release message (or a release with suspend message) from cell 120. Responsive to receiving this message, the terminal device transitions to the idle or inactive mode.

In operation 403, the terminal device is operating in the idle or inactive mode. While operating in this mode, the terminal device may perform measurements of signals (e.g. carrier signals) received from cells of the network as described above.

In some examples, the terminal device may store a time value associated with when an SSB of the measurements is read. In addition or alternatively, the terminal device may record an RSRP or RSRQ value for the measurements.

In operation 404, the terminal device receives a SIB or MIB message from cell 110.

In operation 405, the terminal device determines whether to follow the modified configuration for the measurement validity duration. As explained above with reference to the previous figures, the modified configuration may be received in either the RRC message of operation 402 or the SIB message of operation 404.

As explained above with reference to the previous FIGS., if the network provides a SIB configuration for the measurement validity duration, and the terminal device has also been configured using an RRC message, the configuration from the SIB message may override the configuration from the RRC message. Alternatively, if one configuration only defines a single value for the measurement validity duration, a configuration which indicates dedicated values and/or evaluation reference points for idle and/or inactive mode may override the single-value configuration.

In other examples, the latest configuration received may override any previous configurations for the measurement validity duration. Since different configurations for the measurement validity duration may be in force at different times, information indicative of which configuration to use for a given measurement may be stored along with measurement data. For instance, the terminal device may maintain a window, the lower edge of which is the oldest measurement fulfilling the condition given by a configuration for the measurement validity duration, and the higher edge of which is the latest sample fulfilling the condition.

In some examples, a configuration for the measurement validity duration may indicate that measurements performed prior to receipt of the new configuration should be discarded.

As will be appreciated, if an existing X value is replaced with a larger X value, any measurements previously determined to be valid under the old configuration are also deemed valid under the new configuration.

In some examples, an X value configured at the terminal device (e.g. in the RRC Release message) may be replaced by an X value received in a later configuration when the later X value is smaller than the earlier value. For example, if the RRC release message is indicative of a duration of 5 seconds and an SIB message is indicative of a duration of 60 s, the terminal device is not expected to 'go back in time' (i.e. to check measurements previously determined to be invalid) and instead continues to validate measurements with the 5 second duration. Alternatively, the measurements previously validated using the 5 second duration may be deemed invalid.

In operation 406, the terminal device validates measurements performed while operating in the idle or inactive mode using the measurement validity duration in accordance with the determination made in operation 405.

In operation 407, the terminal device re-establishes a connection with the network and reports the validation results to the network. For instance, if the connection is resumed, the terminal device may re-connect to cell 120. Alternatively, a new connection may be established with cell 110.

FIG. 5 is a flowchart depicting various operations which may be performed in accordance with various examples. For instance, the operations depicted in FIG. 5 may be executed by a terminal device or other suitable apparatus.

In operation S5.1, the terminal device receives, from at least one base station of a telecommunications network, configuration information which is indicative of a modified configuration for a measurement validity duration preconfigured at the terminal device, wherein the measurement validity duration is for use in validating measurements of signals received from at least one cell of the telecommunications network performed by the terminal device in an idle mode or an inactive mode.

In operation S5.2, the terminal device determines whether to follow the modified configuration for the measurement validity duration or the pre-configured measurement validity duration.

In some examples, the method includes operation S5.3a, in which, responsive to determining (in operation S5.2) to follow the modified configuration for the measurement validity duration, the terminal device validates the measurements by applying the measurement validity duration in accordance with the modified configuration indicated by the received configuration information.

In some examples, the method includes operation S5.3b, in which, responsive to determining (in operation S5.2) to follow the preconfigured measurement validity duration, the terminal device validates the measurements by applying the pre-configured measurement validity duration.

In some examples, the method includes operation S5.4, in which the terminal device reports the validated measurements to the telecommunications network.

These operations are discussed in detail above with reference to the previous FIGS. For brevity, such discussion is not repeated here.

As will of course be appreciated, various operations illustrated in FIG. 5 may correspond to operations already described with reference to the preceding Figures. For instance operation S5.1 may correspond to operation 402 or 404 of FIG. 4; operation S5.2 may correspond to operation 405 of FIG. 4; operations S5.3a and S5.3b may correspond to operation 406 of FIG. 4; and operation S5.4 may correspond to operation 407 of FIG. 4.

FIG. 6 is a flowchart depicting various operations which may be performed in accordance with various examples. For instance, the operations depicted in FIG. 6 may be executed by a terminal device or other suitable apparatus.

In operation S6.1, the terminal device determines whether to apply a measurement validity duration for use in validating measurements of signals received from at least one cell of the telecommunications network performed by the terminal device in an idle mode or an inactive mode.

In some examples, the method includes operation S6.2, in which the terminal device validates the measurements without applying the measurement validity duration.

In some examples, the method includes operation S6.3, in which the terminal device reports the validated measurements to the telecommunications network.

These operations are discussed in detail above with reference to the previous FIGS. For brevity, such discussion is not repeated here.

As will of course be appreciated, various operations illustrated in FIG. 6 may correspond to operations already described with reference to the preceding Figures. For instance operation S6.3 may correspond to operation 407 of FIG. 4.

Figures 7, 8, 9:
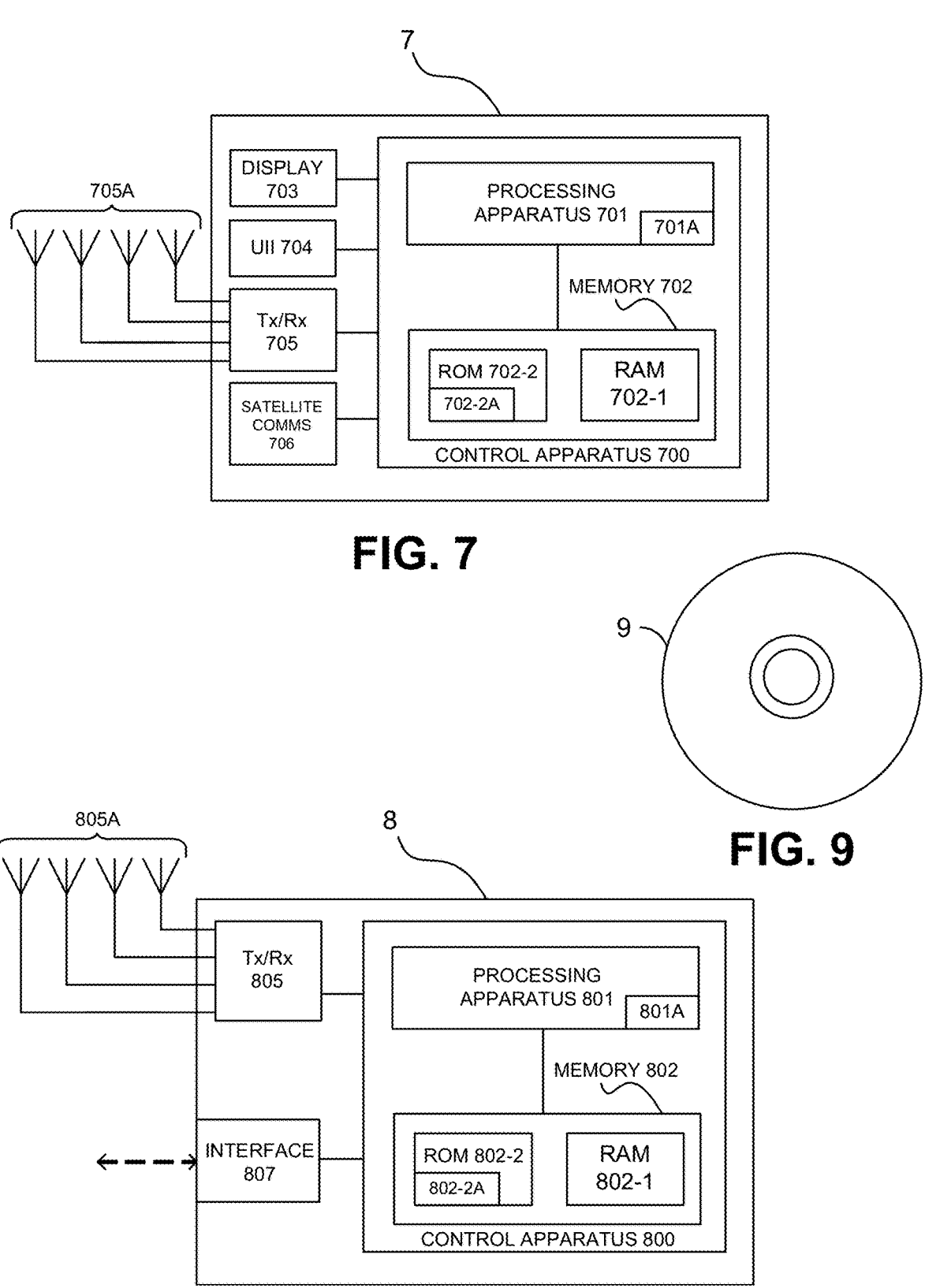
FIG. 7 is a schematic illustration of an example configuration of a terminal device which may be configured to perform various operations described with reference to FIGS. 1 to 6.
FIG. 8 is a schematic illustration of an example configuration of a base station which may be configured to perform various operations described with reference to FIGS. 1 to 6.
FIG. 9 is an illustration of a computer-readable medium upon which computer readable code may be stored.

FIG. 7 is a schematic illustration of an example configuration of a computing apparatus 7 which may be configured to perform various operations described with reference to FIGS. 1 to 6.

Computing apparatus may comprise control apparatus 700 which is configured to control operation of other components which form part of the computing apparatus 7 thereby to enable performance of various operations described with reference to FIGS. 1 to 6. The computing apparatus 700 may comprise processing apparatus 701 and memory 702. Computer-readable code 702-2A may be stored on the memory 702, which when executed by the processing apparatus 701, causes the control apparatus 700 to perform any of the operations described herein.

In addition, computing apparatus may further include a display 703, user interactive interface (UII) 704, radio frequency interface 705 configured to interface radio frequency signals transmitted and received via a radio frequency antenna array 705A, and global navigation satellite system (GNSS) 706. In some examples, other satellite communications systems may be used instead of or in addition to GNSS 706.

FIG. 8 is a schematic illustration of an example configuration of a base station 8 which may be configured to perform various operations described with reference to FIGS. 1 to 6.

The base station 8, which may be referred to an eNB or access point (AP), comprises control apparatus 800 which is configured to control operation of other components which form part of the base station 8 thereby to enable transmission of signals to and receipt of signals from UEs in its coverage area vicinity. For example, the base station control apparatus

800 is configured to cause transmission of reference signals to UEs within its coverage area.

Furthermore, in some examples, the control apparatus 800 may be configured to enable receipt of reference signal measurement data and/or location data from the UEs in its coverage area. The control apparatus 800 may also enable communication with other base stations and/or other network nodes. The control apparatus 800 may additionally be configured to cause performance of any other operations described herein with reference to the base station 8.

The base station 8 comprises a radio frequency antenna array 805 configured to receive and transmit radio frequency signals. Although the base station 8 in FIG. 8 is shown as having an array 805A of three antennas, this is illustrative only. The number of antennas may vary, for instance, from one to many hundreds.

The base station 8 further comprises a radio frequency interface 805 configured to interface the radio frequency signals received and transmitted by the antenna 805A and a control apparatus 80. The radio frequency interface 805 may also be known as a transmitter, receiver and/or transceiver. The base station 8 may also comprise an interface 807 via which, for example, it can communicate with other network elements such as other radio access network entities (such as the other base stations) and/or core network entities.

The base station control apparatus 800 may be configured to process signals from the radio frequency interface 805, to control the radio frequency interface 805 to generate suitable RF signals to communicate information to UEs via the wireless communications link, and also to exchange information with other base stations 8 and core network entities via the interface 807.

The control apparatus 800 may comprise processing apparatus 801 and memory 802. Computer-readable code 802-2A may be stored on the memory 802, which when executed by the processing apparatus 801, causes the control apparatus 800 to perform any of the operations described herein and attributed to the base station 8.

Some further details of components and features of the above-described devices/entities/apparatuses 7, 8 and alternatives for them will now be described.

The control apparatuses described above 700, 800 may comprise processing apparatus 701, 801 communicatively coupled with memory 702, 802. The memory 702, 802 has computer readable instructions 702-2A, 802-2A stored thereon, which when executed by the processing apparatus 701, 801 causes the control apparatus 700, 800 to cause performance of various ones of the operations described with reference to FIGS. 1 to 6. The control apparatus 700, 800 may in some instance be referred to, in general terms, as "apparatus".

The processing apparatus 701, 801 may be of any suitable composition and may include one or more processors 701A, 801A of any suitable type or suitable combination of types. Indeed, the term "processing apparatus" should be understood to encompass computers having differing architectures such as single/multi-processor architectures and sequencers/parallel architectures. For example, the processing apparatus 701, 801 may be a programmable processor that interprets computer program instructions 702-2A, 802-2A and processes data. The processing apparatus 701, 801 may include plural programmable processors. Alternatively, the processing apparatus 701, 801 may be, for example, programmable hardware with embedded firmware. The processing apparatus 701, 801 may alternatively or additionally include one or more specialised circuit such as field programmable gate arrays FPGA, Application Specific Integrated Circuits (ASICs), signal processing devices etc. In some instances, processing apparatus 701, 801 may be referred to as computing apparatus or processing means.

The processing apparatus 701, 801 is coupled to the memory 702, 802 and is operable to read/write data to/from the memory 702, 802. The memory 702, 802 may comprise a single memory unit or a plurality of memory units, upon which the computer readable instructions (or code) 702-2A, 802-2A is stored. For example, the memory 702, 802 may comprise both volatile memory 702-1, 802-1 and non-volatile memory 702-2, 802-2. In such examples, the computer readable instructions/program code 702-2A, 802-2A may be stored in the non-volatile memory 702-2, 802-2 and may be executed by the processing apparatus 701, 801 using the volatile memory 702-1, 802-1 for temporary storage of data or data and instructions. Examples of volatile memory include random-access memory (RAM), dynamic random-access memory (DRAM), and synchronous dynamic random-access memory (SDRAM) etc. Examples of non-volatile memory include read-only memory (ROM), programmable read-only memory (PROM), electronically erasable programmable read-only memory (EEPROM), flash memory, optical storage, magnetic storage, etc.

The memory 702, 802 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

The computer readable instructions/program code 702-2A, 802-2A may be pre-programmed into the control apparatus 700, 800. Alternatively, the computer readable instructions 702-2A, 802-2A may arrive at the control apparatus via an electromagnetic carrier signal or may be copied from a physical entity 9 such as a computer program product, a memory device or a record medium such as a compact disc read-only memory (CD-ROM) or digital versatile disc (DVD) an example of which is illustrated in FIG. 9. The computer readable instructions 702-2A, 802-2A may provide the logic and routines that enables the entities devices/apparatuses 7, 8 to perform the functionality described above. The combination of computer-readable instructions stored on memory (of any of the types described above) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 7 and 8 are examples only and that various operations depicted therein may be omitted, reordered and/or combined.

Although the methods and apparatuses have been described in connection with an E-UTRA network, it will be appreciated that they are not limited to such networks and are applicable to radio networks of various different types.

Although various aspects of the methods and apparatuses described herein are set out in the independent claims, other aspects may comprise other combinations of features from the described embodiments and/or the dependent claims with the features of the independent claims, and not solely the combinations explicitly set out in the claims.

It is also noted herein that while various examples are described above, these descriptions should not be viewed in a limiting sense. Rather, there are several variations and modifications which may be made without departing from the scope of the present invention as defined in the appended claims.

Finally, various additional aspects of the specification are described below.

In a first additional aspect, this specification describes a terminal device comprising: means for determining whether to apply a measurement validity duration for use in validating measurements of signals received from at least one cell of the telecommunications network performed by the terminal device in an idle mode or an inactive mode. In some examples, the terminal device further comprises: means for validating the measurements without applying the measurement validity duration; and means for reporting the validated measurements to the telecommunications network. In some such examples, the means for validating are configured to validate the measurements using at least one sensor of the terminal device.

In some examples, the means for determining are configured to determine not to apply the measurement validity duration responsive to the measurement validity duration being of a specific value which indicates that the measurement validity duration should not be applied. In some such examples, wherein the specific value for the measurement validity duration comprises at least one of: a maximum value for the measurement validity duration, an out-of-range value for the measurement validity duration, and/or a spare value for the measurement validity duration.

In some examples, the terminal device may further comprise: means for receiving a flag which indicates whether the measurement validity duration should be used for validating the measurements, wherein the means for determining are configured to determine not to apply the measurement validity duration responsive to the flag indicating that the received flag indicating that the measurement validity duration should not be used for validating the measurements. In addition or alternatively, the means for determining may be configured to determine not to apply the measurement validity duration responsive to the terminal device being capable of enhanced measurements. In addition or alternatively, the terminal device may further comprise: means for modifying a configuration of the measurement validity duration; and means for validating the measurements by applying the modified configuration for the measurement validity duration.

In a second additional aspect, this specification describes a network node comprising: means for determining not to configure a terminal device with a measurement validity duration for use in validating measurements of signals received from at least one cell of a telecommunications network performed by the terminal device in an idle mode or an inactive mode. In some examples, the means for determining are configured to determine not to configure the terminal device based on a type and/or capability of the terminal device. In addition or alternatively, the network node may further comprise: means for receiving measurements from the terminal device, wherein the measurements have been validated according to internal validity criteria of the terminal device.

In a third additional aspect, this specification describes an apparatus (e.g. a terminal device) comprising at least one processor and at least one memory storing instructions that, when executed by the at least one processor, cause the apparatus at least to perform operations comprising: determining whether to apply a measurement validity duration for use in validating measurements of signals received from at least one cell of the telecommunications network performed by the terminal device in an idle mode or an inactive mode. In some examples, the operations further comprise: validating the measurements without applying the measurement validity duration; and reporting the validated measurements to the telecommunications network. In some such examples, the measurements are validated using at least one sensor of the terminal device.

In some examples, the determination comprises determining not to apply the measurement validity duration responsive to the measurement validity duration being of a specific value which indicates that the measurement validity duration should not be applied. In some such examples, wherein the specific value for the measurement validity duration comprises at least one of: a maximum value for the measurement validity duration, an out-of-range value for the measurement validity duration, and/or a spare value for the measurement validity duration.

In some examples, the operations may further comprise: receiving a flag which indicates whether the measurement validity duration should be used for validating the measurements, wherein the determination comprises determining not to apply the measurement validity duration responsive to the flag indicating that the received flag indicating that the measurement validity duration should not be used for validating the measurements. In addition or alternatively, the determination comprises determining not to apply the measurement validity duration responsive to the terminal device being capable of enhanced measurements. In addition or alternatively, the operations may further comprise modifying a configuration of the measurement validity duration; and validating the measurements by applying the modified configuration for the measurement validity duration.

In a fourth additional aspect, this specification describes an apparatus (e.g. a network node or base station) comprising at least one processor and at least one memory storing instructions that, when executed by the at least one processor, cause the apparatus at least to perform operations comprising: determining not to configure a terminal device with a measurement validity duration for use in validating measurements of signals received from at least one cell of a telecommunications network performed by the terminal device in an idle mode or an inactive mode. In some examples, the measurement validity duration is mandatory for the terminal device to apply. In some examples, the determination comprises determining not to configure the terminal device based on a type and/or capability of the terminal device. In addition or alternatively, the operations may further comprise: means for receiving measurements from the terminal device, wherein the measurements have been validated according to internal validity criteria of the terminal device.

In a fifth additional aspect, this specification describes a method comprising: determining, by a terminal device, whether to apply a measurement validity duration for use in validating measurements of signals received from at least one cell of the telecommunications network performed by the terminal device in an idle mode or an inactive mode. In some examples, the method further comprises: validating the measurements without applying the measurement validity duration; and reporting the validated measurements to the telecommunications network. In some such examples, the measurements are validated using at least one sensor of the terminal device.

In some examples, the determination comprises determining not to apply the measurement validity duration responsive to the measurement validity duration being of a specific value which indicates that the measurement validity duration should not be applied. In some such examples, wherein the specific value for the measurement validity duration comprises at least one of: a maximum value for the measurement validity duration, an out-of-range value for the measurement validity duration, and/or a spare value for the measurement validity duration.

In some examples, the method may further comprise: receiving a flag which indicates whether the measurement validity duration should be used for validating the measurements, wherein the determination comprises determining not to apply the measurement validity duration responsive to the flag indicating that the received flag indicating that the measurement validity duration should not be used for validating the measurements. In addition or alternatively, the determination comprises determining not to apply the measurement validity duration responsive to the terminal device being capable of enhanced measurements. In addition or alternatively, the method may further comprise modifying a configuration of the measurement validity duration; and validating the measurements by applying the modified configuration for the measurement validity duration.

In a sixth additional aspect, this specification describes a method comprising: determining not to configure a terminal device with a measurement validity duration for use in validating measurements of signals received from at least one cell of a telecommunications network performed by the terminal device in an idle mode or an inactive mode. In some examples, the determination comprises determining not to configure the terminal device based on a type and/or capability of the terminal device. In addition or alternatively, the method may further comprise: means for receiving measurements from the terminal device, wherein the measurements have been validated according to internal validity criteria of the terminal device.

In a seventh additional aspect, this specification describes a non-transitory computer readable medium comprising program instructions stored thereon for performing at least any of the operations described above with reference to the fifth and sixth additional aspects.

The invention claimed is:

1. A terminal device comprising:
means for receiving, at the terminal device from at least one base station of a telecommunications network, configuration information which is indicative of a modified configuration for a measurement validity duration pre-configured at the terminal device, wherein the measurement validity duration is for use in validating measurements of signals received from at least one cell of the telecommunications network performed by the terminal device in an idle mode or an inactive mode;
means for determining whether to follow the modified configuration for the measurement validity duration or the pre-configured measurement validity duration;
means for, responsive to determining to follow the modified configuration for the measurement validity duration, validating the measurements by applying the measurement validity duration in accordance with the modified configuration indicated by the received configuration information;

means for, responsive to determining to follow the pre-configured measurement validity duration, validating the measurements by applying the pre-configured measurement validity duration; and means for reporting the validated measurements to the telecommunications network.

2. The terminal device of claim 1, wherein the pre-configured measurement validity duration comprises a first measurement validity duration received at the terminal device from the at least one base station of the telecommunications network, wherein the modified configuration for the measurement validity duration indicated by the received configuration information comprises a second measurement validity duration and indicates that the second measurement validity duration overrides the first measurement validity duration, and wherein the terminal device is configured to follow the modified configuration for the measurement validity duration by using the second measurement validity duration for validation of the measurements.

3. The terminal device of claim 1, wherein the pre-configured measurement validity duration comprises a first measurement validity duration received at the terminal device from the at least one base station of the telecommunications network, and wherein the modified configuration for the measurement validity duration indicated by the received configuration information comprises a second measurement validity duration and indicates that the first measurement validity duration overrides the second measurement validity duration, and wherein the terminal device is configured to follow the pre-configured measurement validity duration by using the first measurement validity duration for validation of the measurements.

4. The terminal device of claim 3, wherein the first measurement validity duration is included in a radio resource control, RRC, message received at the terminal device from the at least one base station of the telecommunications network, and/or wherein the second measurement validity duration is included in a system information block, SIB, message received at the terminal device from the at least one base station of the telecommunications network.

5. The terminal device of claim 1, wherein the terminal device is configured to determine that the measurements are valid when they are performed by the terminal device during a time interval corresponding to the measurement validity duration which ends at a measurement reporting time.

6. The terminal device of claim 1, wherein the configuration information comprises an evaluation reference time, and wherein the terminal device is configured to determine that the measurements are valid when they are performed by the terminal device during a time interval corresponding to the measurement validity duration which ends at the evaluation reference time.

7. The terminal device of claim 6, wherein the evaluation reference time corresponds to the terminal device receiving at least one of: a paging message and a User Equipment, UE, Information Request message, or to the terminal device transmitting at least one of: a Radio Resource Control, RRC, Resume Complete message, a RRC Setup Complete message and a UE Information Response message.

8. The terminal device of claim 1, wherein the configuration information comprises a flag which indicates whether the measurement validity duration should be used for validating the measurements, and wherein the means for determining whether to follow the modified configuration for the measurement validity duration or the pre-configured measurement validity duration, are configured to perform the determination based on the flag included in the configuration information.

9. The terminal device of claim 1, wherein the configuration information indicates that the pre-configured measurement validity duration should be applied for measurements performed by the terminal device in one of the idle mode and the inactive mode and further indicates that the modified configuration for the measurement validity duration should be applied for measurements performed by the terminal device in the other of the idle mode and the inactive mode, wherein the means for determining are configured to determine to follow the pre-configured measurement validity duration for validation of measurements performed by the terminal device in the one of the idle mode and inactive mode, and wherein the means for determining are configured to determine to follow the modified configuration for the measurement validity duration for validation of measurements performed by the terminal device in the other of the idle mode and inactive mode.

10. The terminal device of claim 1, wherein the configuration information is received at the terminal device from the at least one base station of the telecommunications network in at least one of: a system information block, SIB, message, a radio resource control, RRC, message, and/or a medium access control, MAC, message.

11. A method comprising:

receiving, at a terminal device from at least one base station of a telecommunications network, configuration information which is indicative of a modified configuration for a measurement validity duration pre-configured at the terminal device, wherein the measurement validity duration is for use in validating measurements of signals received from at least one cell of the telecommunications network performed by the terminal device in an idle mode or an inactive mode;

determining, by the terminal device, whether to follow the modified configuration for the measurement validity duration or the pre-configured measurement validity duration;

responsive to determining to follow the modified configuration for the measurement validity duration, the terminal device validating the measurements by applying the measurement validity duration in accordance with the modified configuration indicated by the received configuration information;

responsive to determining to follow the pre-configured measurement validity duration, the terminal device validating the measurements by applying the pre-configured measurement validity duration; and reporting, by the terminal device, the validated measurements to the telecommunications network.

\* \* \* \* \*